US008674308B2

(12) United States Patent
Singer

(10) Patent No.: US 8,674,308 B2
(45) Date of Patent: Mar. 18, 2014

(54) DEWAR ASSEMBLY FOR IR DETECTION SYSTEMS

(75) Inventor: Michael Singer, Kfar Vradim (IL)

(73) Assignee: Semi Conductor Devices-Elbit Systems-Rafael Partnership, Haifa (IL)

(*) Notice: Subject to any disclaimer, the term of this patent is extended or adjusted under 35 U.S.C. 154(b) by 0 days.

(21) Appl. No.: 13/820,297

(22) PCT Filed: Oct. 11, 2011

(86) PCT No.: PCT/IL2011/000814
§ 371 (c)(1),
(2), (4) Date: Mar. 1, 2013

(87) PCT Pub. No.: WO2012/049683
PCT Pub. Date: Apr. 19, 2012

(65) Prior Publication Data
US 2013/0153769 A1 Jun. 20, 2013

Related U.S. Application Data

(60) Provisional application No. 61/393,025, filed on Oct. 14, 2010.

(51) Int. Cl.
G01J 5/02 (2006.01)
(52) U.S. Cl.
USPC .......................................... 250/352; 250/353
(58) Field of Classification Search
USPC .................................................. 250/352, 353
See application file for complete search history.

(56) References Cited

U.S. PATENT DOCUMENTS

| 3,878,428 A * | 4/1975 | Kuzminski et al. ............ 313/408 |
| 4,820,923 A | 4/1989 | Wellman |
| 4,990,782 A | 2/1991 | Wellman et al. |
| 5,225,931 A | 7/1993 | Stavroudis |
| 5,793,538 A * | 8/1998 | Cameron et al. .............. 359/731 |
| 2003/0146383 A1* | 8/2003 | Knauth et al. ............. 250/338.1 |
| 2006/0180765 A1 | 8/2006 | Wolske |

FOREIGN PATENT DOCUMENTS

FR 2 887 627 A1 12/2006
WO WO 2007/003729 A1 1/2007

OTHER PUBLICATIONS

Feb. 21, 2012 Search Report issued in International Patent Application No. PCT/IL2011/000814.
Feb. 21, 2012 Written Opinion issued in International Patent Application No. PCT/IL2011/000814.
Oct. 15, 2012 Written Opinion issued in International Patent Application No. PCT/IL2011/000814.
Jan. 30, 2013 International Preliminary Report on Patentability (IPRP) issued in International Patent Application No. PCT/IL2011/000814.

* cited by examiner

Primary Examiner — David Porta
Assistant Examiner — Mindy Vu
(74) Attorney, Agent, or Firm — Oliff PLC

(57) ABSTRACT

A dewar assembly is presented for use in an optical IR detection system defining a light collecting region. The dewar assembly comprises a warm shield unit configured as an enclosure for optically enclosing the light collection region and having an optical window through which incident light enters the dewar. The warm shield defines a reflective inner surface configured such that light portions of the incident light propagating through said optical window onto said inner surface are reflected by the inner surface towards regions outside said light collecting region.

20 Claims, 12 Drawing Sheets

DEWAR assembly -300

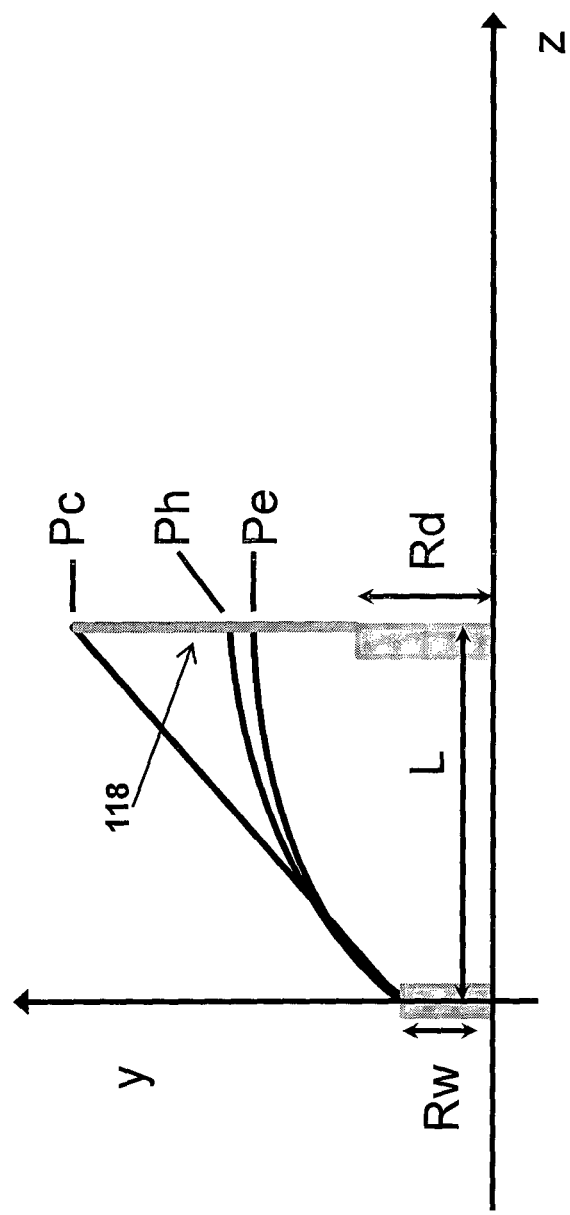

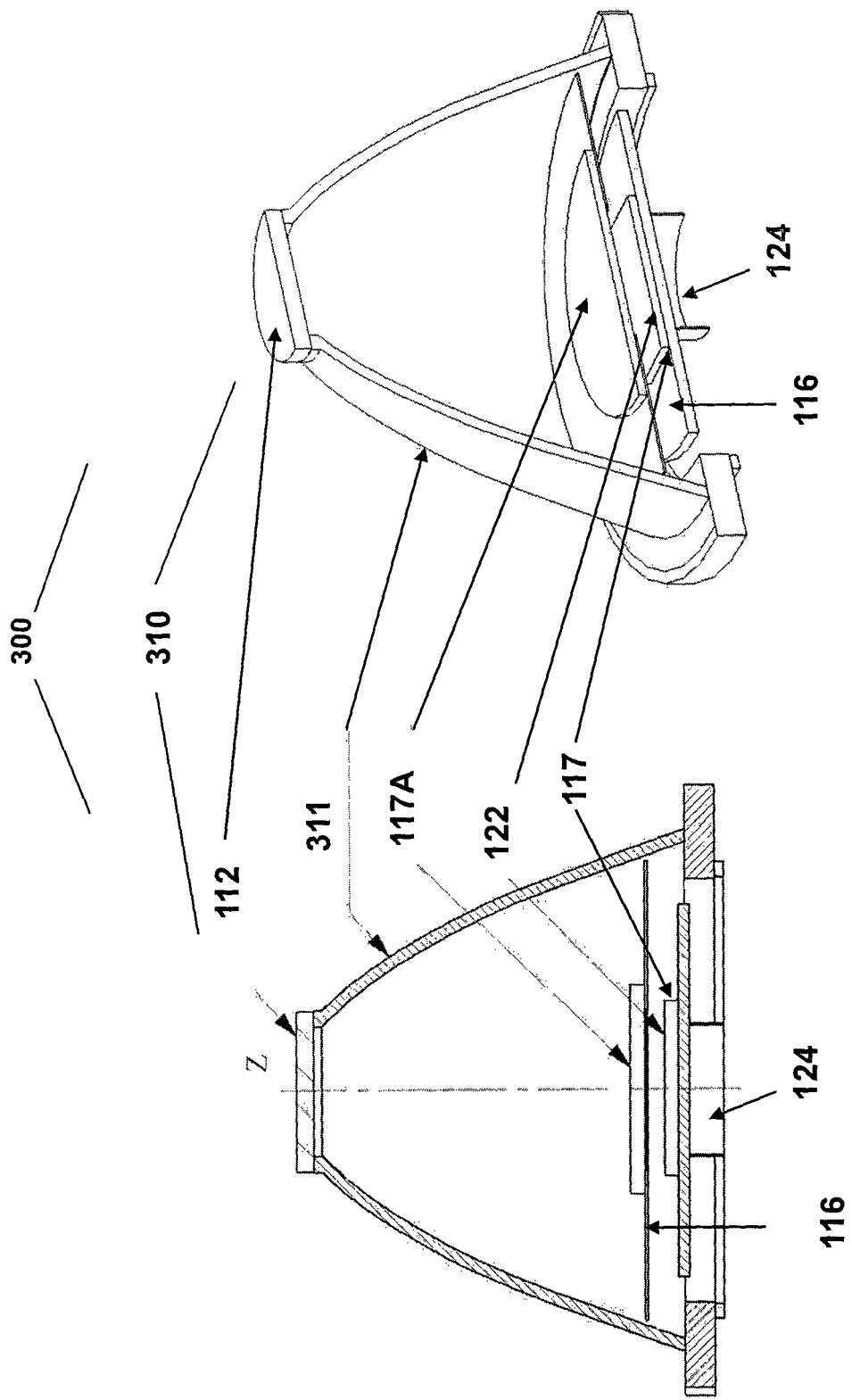

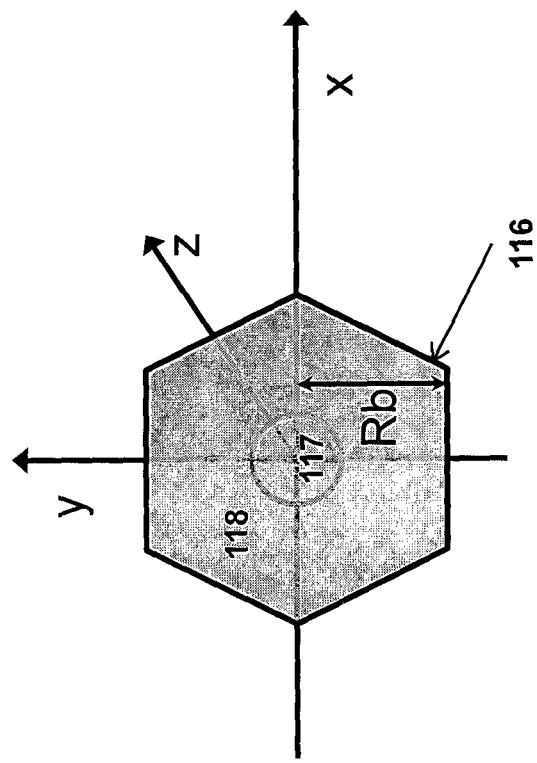
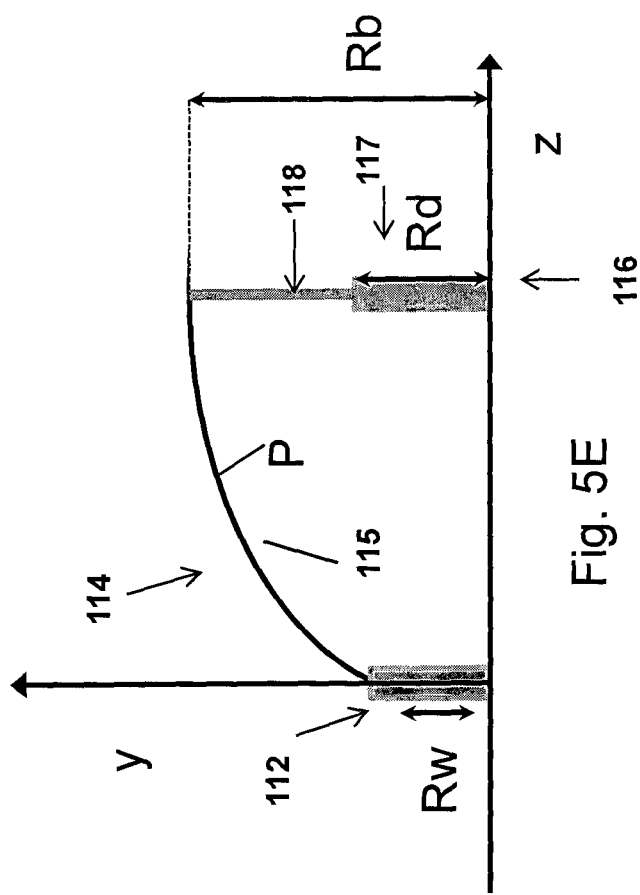
Fig. 5F
Fig. 5E

DEWAR ASSEMBLY FOR IR DETECTION SYSTEMS

FIELD OF THE INVENTION

This invention is in the field of IR detection systems of the kind including an IR detector unit and relates to a dewar assembly for use in such IR detection systems.

BACKGROUND OF THE INVENTION

Existing infra red (IR) detection systems generally include an IR detector (e.g. focal plane array (FPA)) and a dewar assembly enclosing the field of view of the detection systems and operating as a thermal shield masking the detector from thermal radiation arriving out of the enclosed field of view.

Many types of IR detectors operate properly when cooled to very low temperatures (e.g. of the order of 77 to 100° K) and accordingly in IR detection systems of this type the detector is thermally coupled with (e.g. mounted on) a cooling system. Other types of IR detectors, referred to herein as un-cooled IR detectors (e.g. bolometric IR detectors), can operate in ambient temperature conditions and may thus be used without being coupled to a cryogenic cooling system.

Both the cooled and the un-cooled IR detector types are sensitive to radiation arriving within a wide field of view angle (of about 180°) with respect to certain optical axis typically perpendicular to the sensitive area of the detector. In this respect, in order to limit the field of view of the detector to a certain desired field of view of detection system, optical/thermal shields are generally used to prevent radiation, coming from out of the desired field of view, from reaching the detector.

In this regards, one of the functions of dewar assemblies is to limit the effective field of view of the IR detection system to a desired field of view defined by a certain solid angle of light propagation about the optical axis of the detector (smaller than the wide field of view angle of the IR detector itself). Accordingly, dewar assemblies are typically configured to enclose the IR detector with a cylindrical-like structure that at least partially surrounds the optical axis of the IR detection system and defines an optical window (e.g. an optical aperture thereof) through which radiation within the desired field of view reaches the IR detector.

To this end, typical dewar assemblies include cold and warm shields associated respectively with a cold filter and a warm window which are mounted thereon. The cold shield serves to at least partially circumference the optical axis of the IR detection system and to thereby allow radiation of only a limited field of view to arrive at the IR detector. Since the cold shield may by itself emit thermal radiation (parasitic radiation), the cold shield is maintained cooled to relatively low temperatures (e.g. about 100° K) such as to reduce emissions of such parasitic thermal radiation from the shield. Therefore, cold shields are typically enclosed within a warm shield which provides thermal isolation of the cold shield from the outside temperature.

Since the cold shield encloses a portion of the optical path (typically between the cold filter and the detector), it may by itself reflect radiation towards the IR detector, which is undesired radiation entering the system the through the cold filter and impinging onto the walls of the cold shield. Reducing the amount of out of field of view radiation reflected on the detector from the walls of the cold shield can be achieved by utilizing highly emissive/absorptive (blackened) inner surfaces of the cold shield to increase the absorption of such unwanted radiation. It is also known to configure the inner surfaces of the cold shield to be reflective and having special geometrical shapes designed to reflect undesired radiation out of the detector's field of view. The cold shield inner surfaces are cooled for reducing the thermal radiation emitted therefrom.

There are many known techniques aimed at increasing the emissivity of cold shields. According to some of these techniques, a cold shield includes several baffles to support the reduction of unwanted IR radiation. An example of such technique utilizing baffle structure of the cold shield is described in U.S. Pat. No. 5,225,931 according to which an optical system which is provided with a tube having an open front end and a back end, where imaging optics is mounted in the tube, and a plurality of light reflective baffle portions are provided rotationally symmetric with respect to the optical axis. The first baffle portions are configured as ellipsoids of revolution, all with foci lying adjacent edge portions of the open front end of the tube and facing the open front end. The second baffle portions are configured as hyperboloids of revolution facing away from the open end and inwardly of the tube.

U.S. Pat. No. 4,820,923 discloses a warm shield reflector for a cryogenically cooled radiation detector having a reflective surface of toroidal shape. The surface has geometric properties which cause a ray emanating from the detector to be reflected such that a ray is imaged as a defocused ring outside of and surrounding the active detector area. Several such segments are located in front of a small, cryogenically cooled detector shield, to provide an overall detector shielding effect similar to that of a larger, cryogenically cooled shield.

U.S. Patent Publication 2006/180765 describes an infrared imaging system that uses an uncooled elliptical surface section between reflective surfaces to allow a detector to perceive a cold interior of a vacuum chamber rather than a warmer surface of a structure or housing. In this way, background infrared radiation from within the system may be minimized.

WO 07/003729 describes an electromagnetic radiation detection device consisting of a sensor having a surface that is sensitive to said radiation and a cold shield comprising a lateral wall having a cross-section that forms an elliptical arc profile, such that no ray reflected by the wall, originating from an incident ray, comes into contact with the sensitive surface of the sensor.

GENERAL DESCRIPTION

There is a need in the art for thermal shield (dewar) suitable for use in IR detection system and having reduced mass and reduced cooling requirements.

As indicated above, known dewar assemblies includes a non-cooled warm shield and a cold shield encapsulated within (and typically separated from) said warm shield and being thermally isolated from the environment by said warm shield. Cold shields are utilized to mask the IR detector from thermal radiation originating outside from the desired field of view of the detector. Such cold shields are generally configured to enclose an optical path of light (IR radiation) propagation in between an optical window (e.g. cold filter) of the detection system and the IR detector. The cold shield is generally configured to absorb light/thermal-radiation passing through said optical window in an angle outside the desired field of view of the IR detector. In order to enable high signal to noise (SNR) of the detection system, cold shields are typically configured to enable maximal absorbance of radiation impinging thereon and to prevent/reduce the rate of radiation reflectance therefrom. To this end, various techniques, aimed at increasing the emissivity (absorbance), of thermal shields are employed including for example utilization of baffles in the inner structure of the cold shield, utilization of highly emissive coatings and employing rough surface textures to minimize reflections.

However, the addition of baffles increases the thermal capacitance and weight of the cold shield. Also, the use of cold shields having highly emissive interior (inner surface/structure) implies that under a given temperature, relatively high thermal radiation is emitted from the interior surface/structure (e.g. due to the so-called black-body radiation). This is because, for thermal balance to be maintained the amount of energy absorbed by the shield should be equal to the amount of energy evacuated from the shield e.g. by emission of radiation or by cooling of the shield.

More specifically, the thermal radiation from a body is linearly dependent on the emissivity of the body and also proportional to the fourth power of the absolute temperature. Accordingly, the same level of thermal radiation emission from the body can be achieved while operating with highly emissive cold body and with warmer body of high reflectivity.

In this respect, the present invention operates contrary to the conventional approach in which cold shield walls of highly emissive interior surface are used for both maintaining low levels of thermal radiation from the walls and for absorbing radiation arriving through the optical window in a direction out of the field of view of the detector. In the invention, cooling of the shield walls is not essential, while the low levels of thermal radiations are maintained by utilizing highly reflective inner surfaces of the shield walls. In turn, since the highly reflective walls do not absorb the out-of-field-of-view radiation, the walls are configured to reflect such radiation arriving from the optical window (e.g. the optical aperture thereof), onto an absorbance region from which there are only minor reflections and minor thermal emissions.

The SNR of IR detection systems is susceptible to thermal radiation arriving out of the desired field of view of the detector and reaching the detector. Therefore, because of the thermal radiation proportion to the forth order of the temperature, in cases where highly emissive cold shields are used (the conventional approach), cooling of the cold shield to low temperatures (e.g. cryogenic temperatures) is required for reducing the amount of thermal radiation emitted from the inner structure/surface of the shield.

It should be noted here that in the present disclosure the term out-of-field-of-view radiation refers to electromagnetic (e.g. IR/thermal) radiation which originates and impinges on the active/sensitive surface of the shield (e.g. at which the detector is located) from directions out of the desired field of view of the detector. The desired field of view of the detector might be defined as a certain solid angle of light propagation about the optical window (e.g. through an optical aperture thereof) that is characterized in that the optical paths (including the effect of optional optical elements) of light rays (e.g. IR) which pass through said window within said solid angle are directed towards the sensitive area of the IR detector. The perception of out-of-field-of-view radiation by the detector is undesired as it typically blurs the image perceived by the detector and impairs the SNR of the system. Such out-of-field-of-view radiation has two main origins namely: (i) thermal radiation of the shield which is radiation emitted from the inner surface/structure of the shield in accordance with its temperature, and (ii) un-focused radiation which is radiation passing onto the shield (e.g. cold filter in case cold shields are used) through the optical window in an angle outside the desired field of view of the detector and which is reflected, from the inner structure of the shield, onto the detector's sensitive area.

For various applications IR detection systems with high SNR which have small dimensions, light weight, fast cool-down capabilities and/or energetically efficient operation are desired. Increasing the SNR of IR detection systems is obtained, according to the known techniques, by utilizing either highly emissive cold shields or lower temperatures of the shield or both of these conditions for the purpose of reducing the total amount of the out-of-field-of-view radiation impinging onto the detector, namely reducing the thermal radiation of the shield, the un-focused radiation or both.

Highly emissive shields for trapping and absorbing radiation (e.g. unfocused radiation) impinging thereon are typically implemented by utilizing complex structures (e.g. baffles structures) and/or larger and more massive structures which, in turn, incur greater energy exchange with the environment and have greater thermal mass. Use of such highly emissive shield imposes cooling of the shield to very low temperatures for reducing the amount of thermal radiation (blackbody radiation) emitted from the inner surface of the shield and for evacuating heat generated by radiation absorbed by the highly emissive surfaces of the shield. Accordingly, utilizing highly emissive shields as well as utilizing lower temperatures of the shields requires greater heat pumping rate. This in turn requires the use of powerful heat pumps (coolers) which may have several disadvantages such as high energy consumption, high mass (weight) and large dimensions making them less suitable for some applications. Moreover, the use of massive cold shield which, as is typically the case, is hanging from the cryogenic cooling unit (e.g. the cold finger) may result in the IR detection system being susceptible to mechanical vibrations affecting vibrations of the image perceived by the IR detector thus impairing the quality of the image/data recorded by the detector.

The present invention provides a novel system and method for thermally shielding a thermal radiation detection units (IR detectors) from radiation (e.g. IR radiation, visible light etc') arriving from out-of-the-field-of-view of the detector. The invention is associated with a thermal shield having low emissivity (e.g. reflective) surface/structure (inner surface) of the shield walls enclosing the field of view of the detector and designed for reflecting/deflecting radiation arriving from directions out of the detector's field-of-view and to direct such radiation towards outside the detector's sensitive area such that it does not impair the SNR of the IR detection system.

Moreover, utilizing the low-emissivity inner surface of the thermal shield results in low emissions of thermal, blackbody, radiation (for a given temperature of the shield) which allows high SNR of the IR detection system to be obtained at higher temperatures of the shield. Also, utilizing the low-emissivity inner surface of the thermal shield makes the shield less susceptible to ambient temperature variations and thus the variability of the thermal radiation emitted from the shied is reduced allowing higher SNR of the IR detection system.

Low emissivity of a surface is associated with low absorbance of energy from radiation impinging on the surface and with high reflectance of the radiation from said surface. Low emissivity (e.g. not exceeding a few percentages and possibly less than 1%) can be obtained for example by utilizing a highly reflective coating such as specular coating or by utilizing suitable materials internally with a low emissivity/high reflectivity coating.

The technique of the present invention allows for reducing/eliminating the cooling requirements for the IR detection system by configuration of the shape of the reflective (low emissivity) inner surface of the shield walls or parts thereof such that out-of-field-of-view radiation arriving from the optical window and impinging onto the inner surface of the shield is reflected by said surface onto a highly emissive radiation absorption region (e.g. surface or cavity structure) located outside (besides) the sensing region of the IR detector. This enables to achieve adequate SNR of the IR detection system while maintaining the walls of the shield and possibly also the entire shield structure at ambient temperatures (or slightly cooled) and thus reduces or eliminate the cooling requirements of the system.

Indeed, in some cases an IR detection system incorporating the thermal shield of the invention might still require a cooling system for cooling the IR detector itself and possibly also for cooling the radiation absorption region(s) of the shield (i.e. onto which the shield's inner surface directs/reflects out-of-filed-of-view radiation impinging thereon),In these cases the invention provides for obviating/minimizing the cooling requirements of the system by eliminating or at least reducing the need for cooling the shield walls. This presents an advantage of the invention as compared with conventional IR detection systems in which the shield walls require substantial heat pumping resources due to their relatively large surface area and substantial energy/heat exchange with the environment.

Alternatively or additionally, according to some techniques, an IR detection system incorporating the thermal shield of the invention might be operated without utilizing any cooling system and/or by utilizing temperature stabilization systems for stabilizing the temperature of the IR detector itself and possibly also stabilizing the temperature of the radiation absorption region of the shield.

The invention substantially reduces and possibly eliminates the heat pumping rate that is required for cooling and/or stabilizing the temperature of the IR detection. Accordingly, it enables to obviate use of cooling/temperature-stabilization systems or at least allows to utilization of cooling/temperature-stabilization systems having reduced energy consumption, reduced thermal and physical masses and small dimensions.

In accordance with an aspect of the invention there is provided a thermal shield (dewar) for use with an IR radiation detection system of the type including an IR detector. The thermal shield comprises:

a base comprising radiation absorbing regions and arranged for defining a light collecting region of the dewar assembly; and a warm shield unit having an optical window (e.g. an optical aperture thereof) through which incident light enters the dewar, the warm shield unit being configured as an enclosure for optically enclosing the base, and defining a reflective inner surface configured such that light portions of the incident light propagating through said optical window onto said inner surface are reflected by the inner surface towards regions outside said light collecting region.

According to some embodiments of the present invention the reflective inner surface of the warm shield unit is optically exposed to the light collecting region (e.g. at which the IR detector is located). Preferably the reflective inner surface is configured with high reflectivity specifically to radiation in wavelengths to which the IR detector of the system is sensitive. In general and inherently, the reflective inner surface has low emissivity properties reducing the amount of radiation of blackbody radiation emitted from the inner surface under given temperature conditions. This is because in accordance with thermal equilibrium condition, emissivity and reflectivity are generally opposite traits. Also preferably, the outer surface of said warm shield unit has low emissivity properties reducing the amount of radiation absorbed by the outer surface. The thermal shield serves for shielding the IR detector from out-of-field-of-view radiation while reducing and possibly eliminating the cooling requirements of the system. This is achieved by configuring the shape of the inner surface of the warm shield unit (and preferably also the emissivity of the warm shield unit surfaces) such that low amount of radiation is reflected/emitted from the inner surface towards the light collecting region (e.g. location of the detector) even when the surfaces are maintained at relatively high temperature (e.g. relative to the temperature at which the detector operates). Accordingly, in some embodiments to the invention the inner surfaces are not cooled and/or not thermally isolated from the environment. In these embodiments, the warm shield unit may be configured for thermal decoupling of its side walls (having said inner surface) from other parts of the dewar which might be cooled.

As noted above, generally the shape and construction of said reflective inner surface are such that out-of-field of view radiation arriving from said optical window and impinging onto the inner surface is reflected towards outside the light collecting region, and preferably towards one or more radiation absorbing regions which may be located on the base of the thermal shield. According to the invention, there are various shapes and constructions of the reflective inner surface suitable for that purpose. According to some embodiments of the invention, the dewar assembly is configured for use in an optical IR detection system of the kind including a cryogenic cooling system. In these embodiments the dewar assembly may be adapted for thermal coupling between the cryogenic cooling system and the radiation absorbing regions (e.g. located on the base). Accordingly when the thermal shield unit is in operation, the radiation absorption regions are cooled to low (cryogenic) temperatures thus reducing the amount of thermal (blackbody) radiation emitted therefrom. In various embodiments of the invention, radiation absorbing regions are configured for thermal coupling with to the cooling system of the IR detection system which serves for cooling of the IR detector or alternatively or additionally for coupling to a separate cooling system.

Alternatively or additionally, in some embodiments of the invention, the dewar assembly is configured for use in an optical IR detection system of the kind including a temperature stabilization system. In these embodiments the dewar assembly may be adapted for thermal coupling between the temperature stabilization system and the base for stabilizing the temperature of the radiation absorbing regions. Accordingly when the thermal shield unit is in operation, the radiation absorption regions are maintained at substantially constant temperature. The radiation absorbing regions may be configured to be thermally coupled to the system that serves for temperature stabilization of the IR detector (e.g. an uncooled/bolometric detector) or to a separate temperature stabilization system.

It should be noted that according to other embodiments of the present invention, the radiation absorbing regions are maintained in ambient temperature while not being cooled or temperature stabilized. Accordingly thermal coupling of this regions with a cooling or /temperature-stabilization systems might not be required.

Also, in some embodiments the inner surface of the base extending beyond the light collecting region forms the radiation absorbance region. These radiation absorbance regions might be located in the vicinity of the light collecting region and may be implemented as regions of the base. Increasing the emissivity of the radiation absorbing regions can be achieved by utilizing rough blackened surface of the absorbing regions and/or by forming the absorbing regions as cavities (e.g. blackbody cavities).

As noted above the warm shield (e.g. the side walls) of the dewar is configured to define a reflective inner surface constructed such that incident light propagating through the optical window and onto the inner surface is reflected towards regions outside the light collecting region. One simple construction of such thermal shield might be for example in the shape of a truncated cone (i.e. a cone with truncated tip). The base of the thermal shield is, in this example, located at the base of the cone and the light collecting region may be defined as a region at its center. The optical window is implemented in the truncated tip of the cone and the side walls of the shield being the sidewalls of the cone. Configuring the shape of such conic thermal shield such that a reflective inner surface of its side walls projects/reflects out-of-field-of-view radiation onto designated radiation absorbing regions outside the light collecting region, generally imposes to utilize a cone shape with a tip angle above certain minimal value (or equivalently the small angle between the sidewall and the base of the cone being below certain maximal value). Suitable cone angles are dependent on several parameters including for example the dimensions and location of the radiation absorbing region(s), the maximal entry angle of radiation through the optical window, the dimensions of the light collecting region and of the optical window and a distance between them.

Another example for the proper construction of the thermal shield of the present invention is given utilizing the optical properties of a hyperbola or of an ellipse. Generally, light beam passing one foci of an elliptic reflector in any direction towards the elliptic reflector, is reflected by the reflector towards the second foci of the ellipse. Moreover, a light beam crossing the major axis of the elliptical reflector in between the one foci and the curve of the ellipse closer to said one foci is reflected such that it crosses the ellipse major axis again in between the second foci and the curve of the ellipse closer thereto. Hence a thermal shield with reflective inner surface can be properly designed with geometric form, such as an elliptic or ellipsoid geometry, to reflect out-of-field-of-view radiation to regions outside the detector's active/sensitive region.

Accordingly, the invention can be carried out by constructing the inner surface of the side walls such that a cut section (cross action) profile in between the reflective inner surface and a plane containing the optical axis z of the warm shield unit has an arc form of an ellipse or a hyperbole. The minimal form factor (e.g. minimal radius of the base) is achieved when the major axis of the ellipse is tilted with respect to the optical axis such that a first foci of the ellipse is located on a distant edge of the optical window (distant with respect to the portion of the respective arc-like side wall) and the second foci is located on an edge of the light collecting region (closest with respect to the portion of the respective arc-like side wall).

Considering a radially symmetric configuration (rounded optical window and light collecting region (e.g. detector's location), the inner surface of the warm shield unit can have a form similar to the surface formed by rotating such elliptical arc about the optical axis z. In this case, due to the above mentioned optical properties of the ellipse, light rays passing the optical window onto the inner surface of the side walls would be reflected therefrom and directed to a space between said light collecting region and the side walls. This space may be occupied, according to the invention, by highly emissive radiation absorption regions that trap and/or absorb most of the radiation impinging thereon.

Thus, the thermal shield of the invention may not require/include any cold shield. The inner surface of the warm shield unit is not cooled and may be maintained at ambient temperatures. Since no cryogenic cooling of the shield unit is needed or only cooling to temperatures slightly below the ambient temperature, thermal isolation of the shield unit from the environment may not be required and accordingly the multiple (e.g. double) shields configuration is obviated. A dewar assembly for thermal shielding of the IR detector can be formed as a single-shield structure comprising non isolated shield wall(s). The wall(s) interior surface (and possibly also exterior surface) being of low emissivity for minimizing the thermal emissions of therefrom such that low thermal radiation is emitted from the inner surface even when the wall(s) is substantially at the ambient temperature of the environment.

According to another broad aspect of the invention, there is provided an optical IR detection system. The system comprises: an IR detector unit having a light collecting region; and a dewar assembly comprising a warm shield unit having an optical window through which incident light enters the dewar, the warm shield unit being configured as an enclosure for optically enclosing the light collecting region, and defining a reflective inner surface configured such that light portions of the incident light propagating through said optical window onto said inner surface are reflected by the inner surface towards regions outside said light collecting region.

BRIEF DESCRIPTION OF THE DRAWINGS

In order to understand the invention and to see how it may be carried out in practice, some embodiments will now be described, by way of non-limiting example only, with reference to the accompanying drawings, in which:

FIG. 2B exemplifies three different profiles of an inner surface of the thermal shield;

FIGS. 3A to 3C illustrate an IR detection system according to an example of the present invention configured for use with a cooled IR detector;

FIGS. 5A to 5G illustrate a few more examples of the thermal shield' configurations according to the present invention.

DETAILED DESCRIPTION OF EMBODIMENTS

Figure 1A:
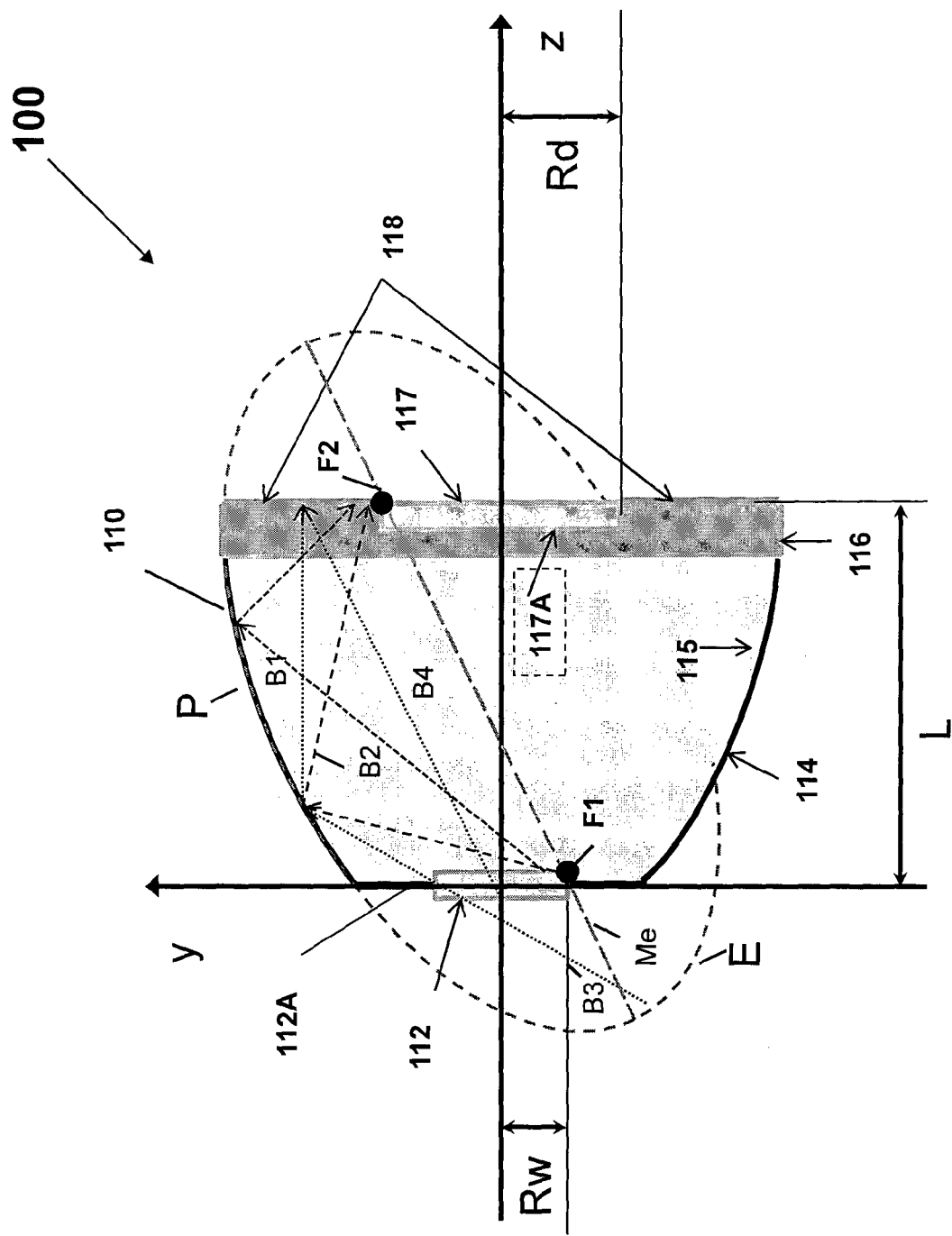
FIGS. 1A and 1B show an example of a dewar assembly according to the present invention utilizing a single-shield configuration of a thermal shield unit.
Figure 1B:
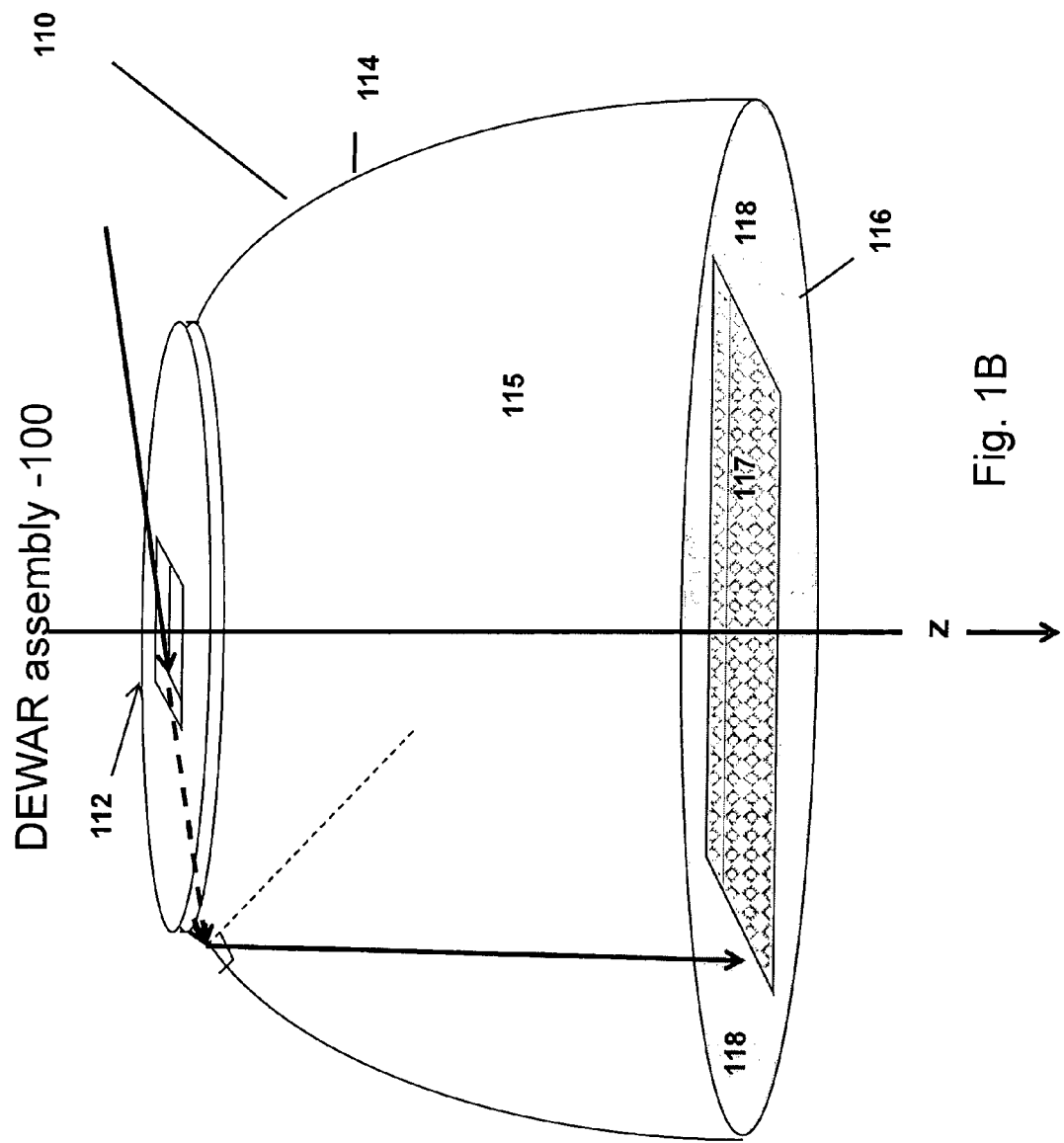

Reference is made to FIGS. 1A and 1B which show schematically an example of a dewar assembly 100 configured and operable according to the present invention for use with an IR detection system, which is not specifically shown here and includes an IR detector. FIG. 1A is a cross sectional view of the dewar assembly 100 taken with a secant a plane containing an optical axis z of the assembly 100; and FIG. 1B is an exploded view of the dewar assembly 100.

The dewar assembly 100 includes a thermal shield 110 configured according to the invention. The thermal shield is a warm shield unit which in the present example serves as a warm shield of the assembly 100. The thermal shield 110 is configured, as described below, for having reduced levels of thermal radiation from its inner surface and is thus suited for use as the inner surface of the DEWAR 100 while it is exposed to ambient temperature (e.g. without requiring use of a cold shield encapsulated in the shield 110).

The thermal shield 110 includes a base 116, and a warm shield unit including an optical window 112 and side walls 114 extending in between the base 116 and the optical window 112. The base 116 includes radiation absorbing regions 118 and defines a light detection/collecting region 117 designating a location for the IR detector and at times referred to herein below as "detector location". It should be noted that the light collecting region 117 may be constituted by an optical window configured for collecting and passing radiation to be detected towards an IR detector, or may be a designated location upon which the IR detector is to be installed. The location 117 of the IR detector and the optical window 112 are arranged with respect to each other such that radiation, coming from the desired field of view of the detector and propagating through the optical window 112 along the general direction of the optical axis z, reaches (intersects with) the location 117 of the IR detector.

The side walls 114, extending between the base 116 and the optical window 112, are arranged to enclose the optical axis z in a region between the optical window 112 and the detector location 117. The side walls 114 operate as a warm shield enclosing the detector location 117 from out-of-field-of-view thermal radiation. Inner surface 115 of the side walls 114 (or at least certain regions thereof) is reflective (specular reflective) and is configured for low emissivity at least with respect to a spectral range of to which the detector is sensitive. Since temperature dependent thermal radiation is linearly dependent on the emissivity, the low emissivity (high reflectivity) of the inner surface 115 of the side walls 114 enables the shield 110 to operate at relatively high temperatures (ambient temperatures) as low levels of thermal (black body) radiation from the side walls arrive at the detector's location 117. Additionally, the shape of the inner surface 115 is designed such that out of field of view radiation passing through the optical window 112 is directed towards regions/areas outside the detector location 117.

In accordance with the configuration described above, the inner surface 115 of the side walls 110 may enclose the optical path z between the optical window 112 and the detector's location 117 while being optically exposed to the light detection region 117. Accordingly, use of a cold shield for optically encapsulating light detection region 117 may be obviated according to the invention.

Further shown in the figure is a cross sectional profile P of the reflective inner surface 115 of the side walls 114. The reflective inner surface 115 is configured such that light beams B1, B2 and B3 (exemplifying out-of field of view radiation) that pass through the optical window 112 and impinge onto the reflective surface 115 are reflected by said surface towards light/radiation absorbing regions 118 of the base 116. In the present example, this is achieved by configuring the reflective surface 115 such that its cross sectional profile P is in the form of an elliptical arc being a part of an ellipse contour E.

The parameters of the ellipse E are selected in accordance with a desired distance L between the optical window 112 and the detector location 117 and in accordance with dimension Rw (e.g. radios or width) of the optical window 112 and the dimension Rd of the detection location 117. In this example, focal points F1 and F2 of the ellipse E are located at opposite sides of the optical axis z such that they are located on the edges of or outside the optical window 112 and the detector location 117 respectively. Due to the optical properties of the ellipse, light beams, such as B1 and B2, which pass through the first focal point F1 of the ellipse E and impinge onto the inner surface 115 are reflected towards the second focal point F2 of the ellipse E outside the location 117 of the detector (outside the area at which the light sensitive region of an IR detector is to be placed).

Moreover, due to the optical properties of the ellipse, reflections of the light beams, which cross major axis Me of the ellipse not between the two focii F1 and F2, would also cross the major axis Me of the ellipse outside the region between the two foci F1 and F2. Hence, any light beam passing the optical window 112 in a direction out of the field of view of the detector (e.g. not directed towards the location 117) is either directly directed towards the light absorbing regions 118 (e.g. light beam B4) or is directed towards the inner surface 115 from which it is reflected towards the light absorbing regions 118 (e.g. light beam B3).

Light/radiation absorbing region(s) 118, towards which out-of-field-of-view radiation is directed by the inner surface 115, is preferably configured to absorb most of the radiation impinging thereon. This condition is achieved according to the invention by configuring the light absorbing regions 118 with highly emissive color/coating which absorb most of the radiation impinging thereon. Also, increased emissivity might be achieved by configuring these regions with rough surface and/or with scattering surfaces and/or with baffled structure such that radiation impinging thereon experiences multiple reflections at each baffle and substantial part thereof is absorbed/scattered. In the present example, the radiation absorbing regions 118 are constituted by the inner surface of the base 116 at a region surrounding the detector location 117.

It should be noted here that the thermal shield 110 of the invention may be used as a fully un-cooled thermal shield, i.e. with no cryogenic cooling coupled thereto, or it can be configured as partially cooled shield with cryogenic cooling coupled to the radiation absorbing regions 118 of the base and not to the side walls 114 and optical window 112. Actually, due to the shape and low emissivity of the inner surface 115 of the side walls 114, thermal radiation that is emitted from the side walls 114 and radiation that pass through window 112 and reflects from the side walls 114 do not substantially impair the SNR of a signal detected by an IR detector (not shown). Also, according to the invention, thermal radiation that, is emitted from the highly emissive radiation absorbing regions 118 can be reduced, for example by applying cryogenic cooling to those regions, or it can be controlled and/or accounted for in the signal detected by the IR detector.

Use of the thermal shield 110 of the present invention as a warm shield (i.e. without cooling the optical window 112 and the side walls 114 enclosing the optical path/axis z) enables to obtain an IR detection system with low energy consumption. On the contrary, in conventional IR detection systems, a substantial part of the energy consumed by the system is used for cooling of the IR detector and the cold shield. Hence, providing a DEWAR assembly in which cooling is not always required or in which only relatively small regions (118) require cooling is advantageous. Also, since the side walls 114 of the shield of the present example are not cooled, then generally thermal isolation of the side walls 114 is not required. This may reduce the form factor and weight of the DEWAR assemblies utilizing the invention.

As noted above, cooling of the radiation absorbing regions 118 of the thermal shield 110 may be obviated for example by controlling the thermal radiation from those regions 118. This can be achieved, for example, by configuring regions 118 with rough/diffusive surface such that the thermal radiation/energy emitted therefrom is diffused and is thus perceived substantially spatially homogeneous at the detector location 117. Optionally, alternatively or additionally, the temperature of the radiation absorbing regions 118 is also controlled and maintained at substantially constant value (e.g. 25° C.). This provides for low temporal variability in the thermal emission from the radiation absorbing regions 118. Temperature stabilization may be obtained for example by utilizing TEC devices operated to maintain the radiation absorbing regions 118 and possibly also the IR detector at a fixed/constant temperature.

Controlling/blurring the spatial and/or temporal distributions of the thermal radiation reaching the detector from the radiation absorbing regions 118 allows to consider and to account for the effects of this radiation on the detected signal in an accurate manner. It should be noted however, that also when the radiation absorbing regions 118 are not cooled and not temperature stabilized, the effects of the radiation emitted therefrom might be accounted for in the detected signal by means of various signal processing algorithms.

As was also noted above, according to some embodiments of the invention, the light absorbing regions 118 are configured for allowing low levels of thermal radiation emission therefrom. This improves the performance (SNR) of the IR detection system by reducing the amount of radiation originating from the light absorbing regions 118 and impinging (directly or via reflection from the inner surface of the shield) on the location of the detector. Reducing the thermal emissions from these light absorbing regions 118 is achieved according to some embodiments of the invention by cooling these regions 118 to low, preferably cryogenic, temperatures. In such embodiments the light absorbing regions 118 are associated with one or more thermal coupling elements (not specifically shown) that enable high thermal coupling of these regions with a cooling system. As these regions are typically located in the vicinity of the IR detector (which may also require cooling), the same cooling system of the IR detection system may serve for both cooling the IR detector and cooling the light absorbing regions 118.

It should be noted that the base 116 may be configured for thermal coupling the cooling system with the radiation absorbing regions 118. In some embodiments of the invention, the IR detector is to be placed at location 117 on top of the inner surface of the base 116 such that the base 116 serves also for thermal coupling of the IR detector to the cooling system.

In cases where cryogenically-cooled or temperature-stabilized IR-detector are used, a cold filter 117A of the IR detection system may be located on top of the detector location 117 (e.g. directly on top of which or it may be generally located along an optical path in between the optical window 112 and the detectors location 117. Accordingly the cold filter 117A may be thermally coupled, directly or indirectly, with a cooling- or temperature-stabilization-systems (not shown) of the IR detection system In embodiments where the radiation absorbing regions 118 of the base 116 are cooled to low/cryogenic temperatures, the light absorbing regions 118 are preferably made of thermally conductive material such that heat generated by the absorbed radiation is efficiently conducted towards the cooling system. As the radiation absorbing regions 118 typically extend towards the side walls, and in order to reduce the amount of heat exchange between the walls 114 and the base 116, thermal decoupling of the could base 116 from the walls is typically used. This might be achieved for example by utilizing thermal isolating material (layer) at the interface in between the base and the wall, or by utilizing a weak thermal conductor material for making the walls (or any other thermal decoupling approach).

Moreover, in order to reduce the susceptibility of the temperature of the sidewalls 114 to the radiation (e.g. IR) outside the dewar, the exterior surface of the side walls is preferably also highly reflective.

Furthermore, a dewar assembly comprising the warm shield 110 has reduced weight, lower heat capacitance and thus lower heat load on the cooling system (e.g. cold finger) of an IR detection system. This enables to increase the natural frequency of the cooling system (e.g. of the cold finger) and reduce the IR detector (e.g. FPA) movement during vibrations. The warm shield 110, which may function also as the dewar's outer housing, eliminates the need for utilizing additional separate shield (e.g. cold shield) within the assembly 100.

Figure 2A:
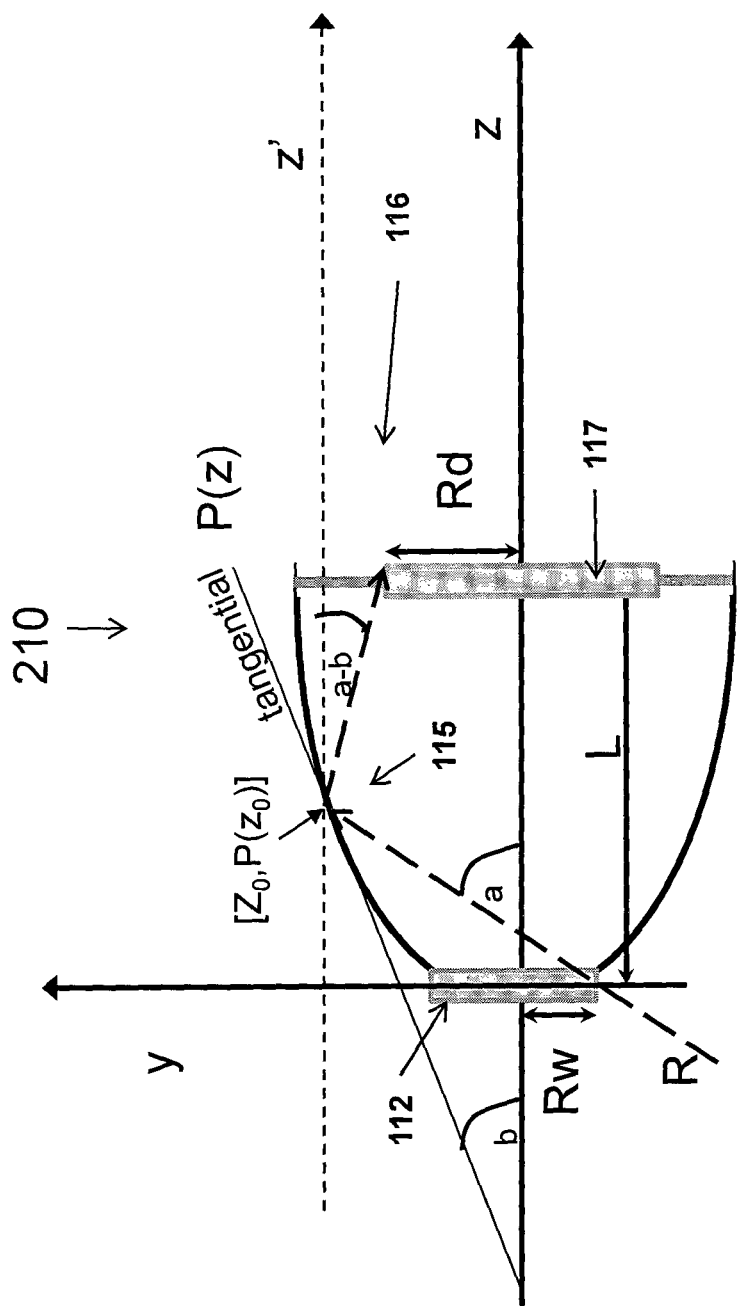
FIG. 2A is a cross sectional view of a thermal shield for use in the dewar assembly.

It should be understood that in some embodiments of the present invention (as in the above-described example), the optical window 112 is implemented on a surface 112A stretching in between the side walls 114. In this case, when the shield 110 functions as a warm shield and the side walls 114 are not cooled, then also the surface 112A is not cooled as well. Typically these windows (or filters) have low thermal emissivity. It should be understood that in other embodiments of the present invention, surface 112A might not exist at all and the optical window 112 might extend in between the side walls 114. Reference is made to FIG. 2A illustrating schematically a thermal shield 210 according to the invention. For clarity and without lose of generality, when referring to elements of the thermal shield in the following description of embodiments, reference numerals of FIGS. 1A and 1B are used to designate common elements of the examples of the invention. It should also be understood that in the description of FIGS. 2A and 2B not all the elements of the thermal shield are illustrated but only those elements considered pertinent for the understanding of the following description.

In FIG. 2A, a cross sectional view of the thermal shield 210 is shown, taken within a plane containing the optical axis designating the general direction of light propagation through the shield. A coordinate system, defined by the z- and y-axes is illustrated in the figure having the origin lying at the center of the optical window 112 of the shield. The inner surface 115 of the shield in between the optical window 112 and the base 116 is represented by a cross sectional profile P(z).

In the figure, there is illustrated the optical path of a light ray R, which enters the thermal shield 210 through the optical window 112, impinges onto the reflective inner surface 115 at a point $[z_0, P(z_0)]$, and is reflected therefrom towards the radiation absorbing region 118 of the base 116 located outside the detector location 117. Depicted light ray R is considered as representing the steepest light beam that can pass the optical window 112 and impinge at point $[z_0, P(z_0)]$ of the inner surface 115.

For given dimensions, Rw and Rd, of the optical window 112 (i.e. the optical aperture of the optical window) and the IR detector location (e.g. 117) and for a given distance L between them, the thermal shield according to the invention might be constructed with any profile P(z) of the reflective region of its inner surface of the side walls which satisfies the following in-equivalence for any z:

$P(z)-(L-z)*\mathrm{Tan}(a-b) > Rd$

The angle a is given by $a = \mathrm{Tan}^{-1}((Rw+P(z))/z)$ and is representing the angle, with respect to the z axis, of the steepest light beam passing the window 112 towards the inner surface 115. The angle b is determined as $b = \mathrm{Tan}^{-1} dP(z)/dz$ and is the angle between the profile P(z) and the z axis at certain z point (the $[z_0, P(z_0)]$ point).

Accordingly, the invention can be implemented by constructing the reflective surface 115 of the side wall 114 such that the equation above is satisfied for any (one or more) cross sectional profile(s) P(z) of the side walls taken with any (one or more) secant plane(s) containing z axis. This ensures that any light beam, including the steepest light beam (with respect to the z axis) that passes the optical window 112 and impinges onto the inner surface 115 is reflected therefrom towards outside the detector location 117.

It should be noted that by utilizing different profiles for construction of the inner surfaces 115 of the side walls 114 of the shield, thermal shields of different form factors may be obtained for given required dimensions of the optical window 112 and the IR detector location 117 and for given required distance L between them. It should also be noted that the profile P(z) of the inner surface 115 of the side walls 114 is not necessarily a smooth function. Accordingly, as illustrated below, the invention can be implemented with the side walls 114 made by multiple facets as long as the profile of the inner surface formed by these facets satisfies the above equation.

Turning now to FIG. 2B, there are illustrated schematically three different profiles of an inner surface of the shield according to the present invention. Profile Pe is an elliptical profile constructed similarly to the construction of the profile P of FIG. 1A thus providing reflection of out-of-field-of-view light beams onto regions outside the sensitive region of the detector. Profiles Ph and Pc exemplify two geometrical cross section profiles that are suitable for use in the inner surface cross sectional profile of a warm shield according to the invention (e.g. similar to the shield 110 of FIG. 1A). Here, Ph is a hyperbolic arc profile and Pc is a truncated con profile. The hyperbolic arc profile Ph utilizes the mathematical property of the hyperbola in such a way that no ray reflected by the warm shield wall, that emanates directly from an incident ray that passes through the warm shield aperture (optical window 112), reaches the IR detector (e.g. FPA). Such construction of the inner surface profile ensures that any light rays out-of-field-of-view of the detector that are reflected by inner surface of the profile Pe wall towards outside the sensitive region of the detector are also reflected by the inner surfaces of the profiles Ph- and Pc-wall towards outside the sensitive region of the detector. However, these profiles are typically associated with a thermal shield having larger form factor, and more specifically larger dimension of the base 116 and the radiation absorbing regions 118.

Figure 3A:
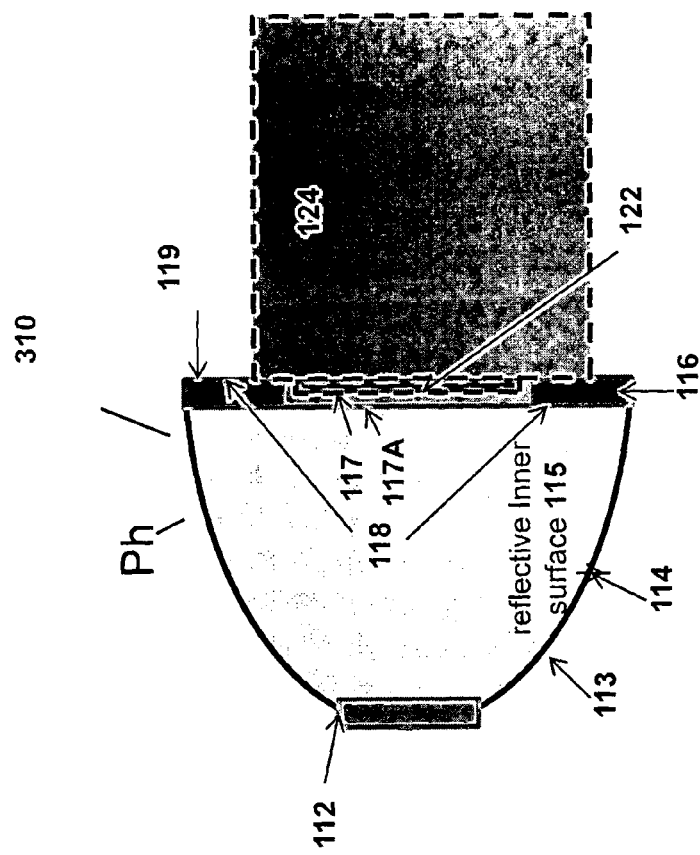

Turning now to FIGS. 3A to 3C, there is illustrated an IR detection system 300 according to an example of the present invention in which thermal emissions from the light absorbing regions of the DEWAR are reduced by cooling them to low temperatures. In the following description, reference will be made to these figures together. The IR detection system 300 includes an IR detector 122, a cooling system 124 and a DEWAR assembly 310, configured and operable according to an embodiment of the present invention.

In this example, the DEWAR assembly 310 includes a thermal shield 311 comprising similar elements as the above described thermal shield of FIGS. 1A and 1B, namely including an optical window 112, a base 116 and side walls 114 enclosing the general direction of light propagation in between the optical window 112 and the base 116. The thermal shield 311 in the present example functions as a warm shield, and both the internal and the external surfaces of the shield's side walls 114 are configured for low emissivity of thermal radiation (e.g. emissivity not exceeding a few percent and more preferably less than 1% emissivity of radiation in wavelengths to which the IR detectors is sensitive).

The IR detector 122 is located at and thermally coupled to a designated location 117 on an inner surface of the base 116 facing the interior of the DEWAR 210. The base 116 is made of one or more thermally conductive materials and is thermally coupled to the cooling system 124 such that when the cooling system is in operation, the inner surface of the base 116 is cooled to low cryogenic temperatures. Regions of the cooled inner surface of the base 116 which extend between the IR detector 122 and the side walls 114 are configured with high emissivity (e.g. blackened and roughened such as to increase light emissivity) and thus serve as the light/radiation absorbing regions 118 of the thermal shield 311.

As noted above, the designated location 117 for the IR detector 122 on the base 116 corresponds to a location towards which radiation to be detected is directed. This location 117 on the base 116 may be the location on top of which the IR detector 122 is to be installed or an optical window (e.g. aperture or cold filter) through which radiation to be detected passes towards the detector. As shown in FIGS. 3B and 3C, in the present example the IR detector 122 is installed directly on the cold finger 124 of the IR detection system. The base 116, which is also thermally coupled with the cold finger 124, includes a cold filter 117A which is located above the designated location 117 of the IR detector 122 (in between the location of the detector 117 and the optical window 112). The cold filter 117A, in this case, is thermally coupled indirectly (through the base 116) with the cold finger 124.

Similarly to the shield 110 described above with reference to FIG. 1A and 1B, also in this example the shape (the cross-sectional profile of the reflective inner surface 115) of the side walls 114 is configured such that out-of-field-of-view radiation entering the DEWAR 210 through the optical window 112 is reflected by the side walls 114 towards radiation absorbing regions 118 of the cooled inner surface of the base 116. In this example, the inner reflective surface 115 of the sidewalls 115 is configured with hyperbolic cross sectional profile Ph.

Figure 4:
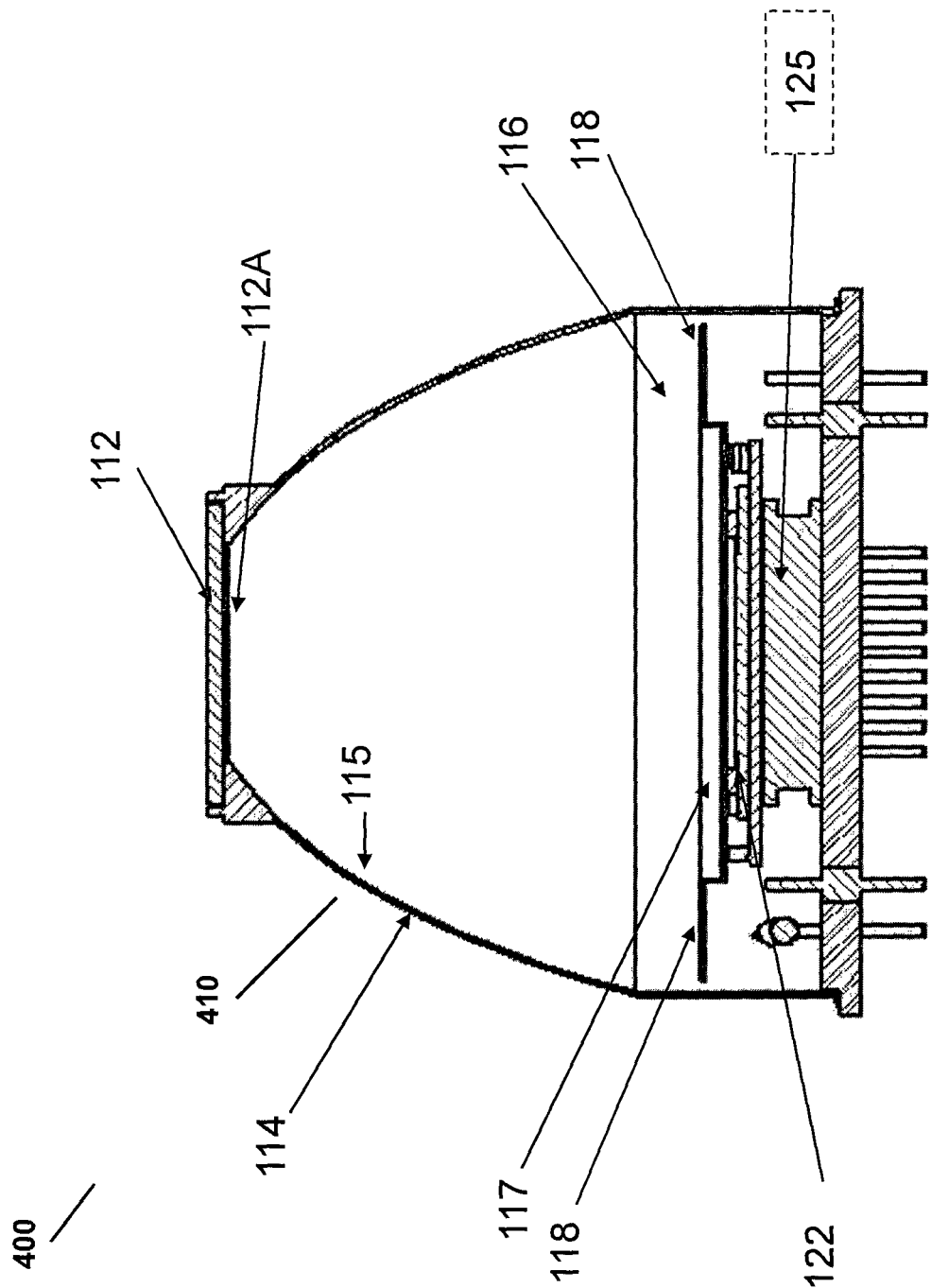
FIG. 4 illustrates an IR detection system according to another example of the present invention adapted for use with un-cooled IR detector.

Reference is now made to FIG. 4 illustrating schematically an IR detection system 400 according to an example of the invention, where the system 400 utilizes an un-cooled IR detector. Light absorbing regions 118 of the DEWAR in this example are also not cooled to low/cryogenic temperatures. The IR detection system 400 includes an un-cooled IR detector 122 (being in this particular example a bolometric IR detector) and a DEWAR assembly 410 configured and operable according to the present invention.

The DEWAR assembly 410 of the present example and the thermal shield 110 described above with reference to FIGS. 1A and 1B include similar elements are denoted with the same reference numeral. The DEWAR assembly 410 includes an optical window/filter 112, a base 116 including radiation absorbing regions 118 and detector location 117, and side walls 114 enclosing the general direction of light propagation in between the optical window 112 and the base 116. In this example the side walls 114 define an aperture stop 112A of light propagating from the optical window.

The DEWAR assembly 410 functions as a fully un-cooled shield, namely shield's side walls 114 as well as its base 116 (including radiation absorbing regions 118) are maintained un-cooled and at temperatures above the cryogenic temperature (e.g. near about the ambient temperature). Similarly to the configuration described above with respect to FIG. 1A and 1B. internal and the external surfaces of the shield's side walls 114 are configured for low emissivity of thermal radiation thus allowing low thermal radiation absorbance from the exterior of the shield and also low thermal (blackbody) radiation emissions from the inner surface 115 of the walls. Additionally, also here, the profile of the inner surface 115 of the side walls 114 is configured to reflect out-of-field-of-view radiation, which impinge thereon from the optical window 112, onto regions outside the detector's sensitive area (e.g. towards the light/radiation absorbing regions 118 of the base 116).

In turn, the light absorbing regions 118, onto which typically most of the out-of-field-of-view radiation impinging the walls 114 is directed, are configured with high absorbance/low reflectivity such that focused/non-diffused radiation is substantially not reflected therefrom directly or indirectly towards the IR detector. Indeed, since thermal equilibrium is maintained, the energy absorbed by the light absorbing regions 118 is emitted from the base 116 as blackbody radiation. However, the pattern/spatial-distribution of the blackbody radiation emitted from the base 116, is controlled and is substantially independent of the pattern of light entering passing through the optical window 112. Actually, the radiation emitted from the base 116 is diffused/non-directional (due to the highly absorbing structure/coating of the light absorbing regions 118, e.g. due to a rough/baffles structure) and has substantially spatially homogeneous intensity (e.g. due to thermal conduction within the base and black coating diffusing properties). Accordingly a thermal noise from the base 116 (e.g. thermal "image" of the base 116 reflected from the sidewalls 114 onto the IR detector 122) can be accounted for (e.g. subtracted/suppressed) in the signal obtained by the IR detector 122 thus providing improved SNR.

Indeed, the intensity of the thermal noise from the base 116, captured by the IR detector 122, depends on the temperature of the base 116. Accordingly and optionally in some embodiments of the invention, the temperature of the base 116 and of the radiation absorbing regions 118 is stabilized to substantially constant temperature allowing to account for this thermal noise more accurately. In the present example, a heat-pump module 125 (e.g. a thermo-electric-cooler TEC), being part of a temperature stabilization assembly (not completely shown) is thermally coupled to the bolometric IR detector 122 and to the base 116 of the DEWAR assembly 410. The heat-pump module 125 is operated by the temperature stabilization assembly to maintain IR detector 122 and the base 116 at substantially constant and stationary temperature conditions. This improves the performance (SNR) of the IR detection system 400 as it allows to accurately consider and account-for the noise emitted from the base 116.

It should be noted here that fixing the temperature of the base 116 (e.g. by means of a temperature stabilization assembly) is optional. The performance of the IR detection system might otherwise be improved by means of other (e.g. alternative) techniques which don't utilize temperature stabilization of the base 116. For example utilizing specifically designed algorithms which estimate the amount of thermal noise projected from the base onto the IR detector at various temperatures of the base 116.

In this specific non limiting example, the designated detector location 117 on the base 116 is actually an aperture through which light to be detected passes towards the bolometric IR detector 122. It should however be understood that according to the present invention either one of the optical window 112 and the designated location 117 may be implemented as any one of a filter and an optical window an aperture stop or other optical elements. As indicated above, the designated location 117 may also be the actual location on top of which the detector is installed.

FIGS. 5A to 5G illustrate in a self explanatory manner a few more examples of the thermal shields configurations according to the present invention. In these examples, the side walls 114 of the shield comprise multiple facets. The thermal shields illustrated in these figures include similar elements as those described above with respect to the thermal shield 110 of FIGS. 1A and 1B designated with the same reference numerals. More specifically, the cross sectional profile of the inner surface 115 of the thermal shield extending in between the optical window 112 and the base 116 is characterized by substantially discontinuous slope (derivative).

Figure 5A:
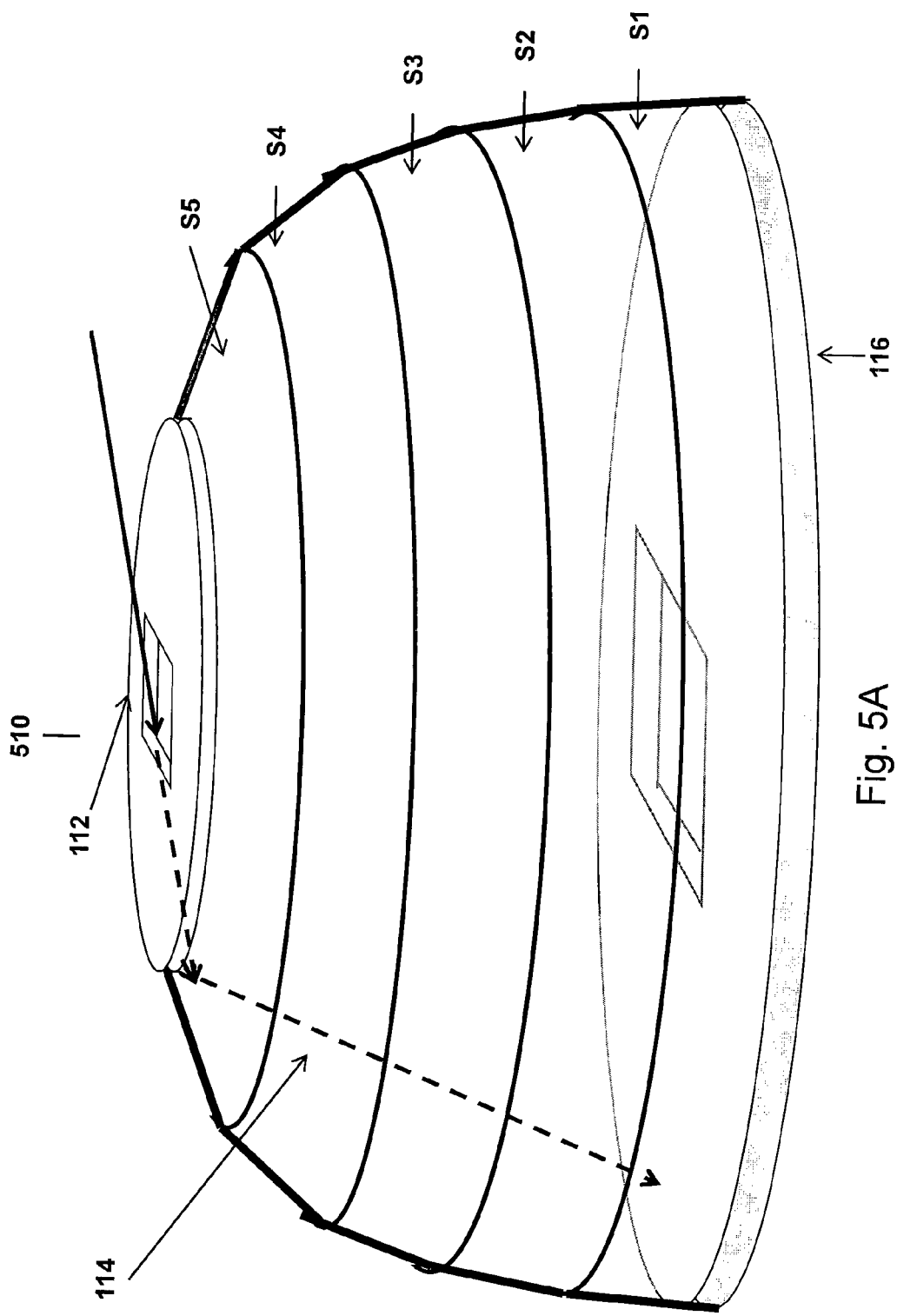
Figure 5C:
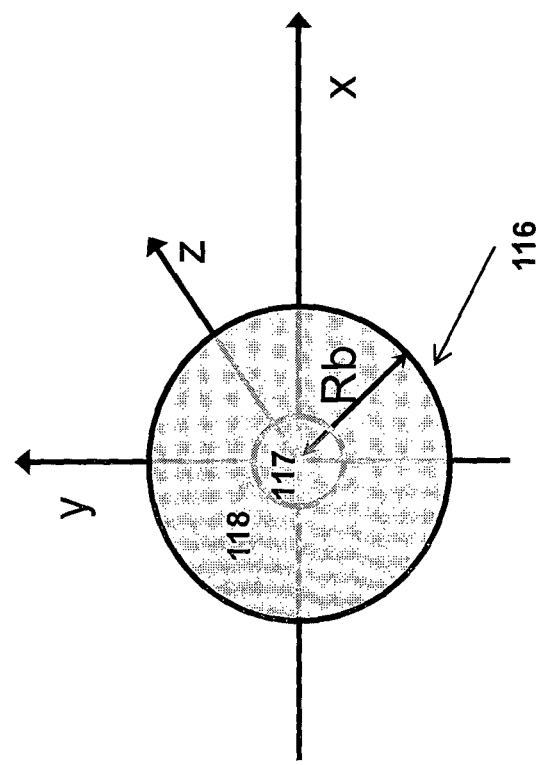
Figure 5B:
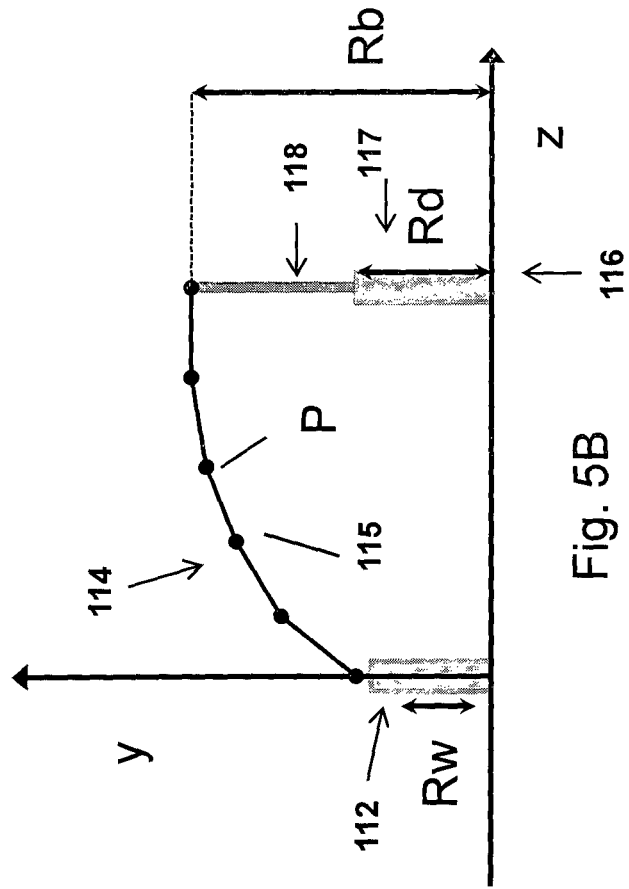

FIGS. 5A, 5B and 5C show an example of a thermal shield 510 of the present invention in which the side walls 114 are formed by multiple ring-like (or truncated cone resembling) structures S1-S5. FIG. 5A illustrates an exploded view of the shield 510 of the present example. FIG. 5B is a cross sectional view of the shield taken with and arbitrary secant plane containing the optical axis z of the shield. FIG. 5C is a cross sectional view across sectional view of the base 116 of the shield 510 taken perpendicularly to the optical axis z. In this example, as can be seen from FIG. 5C, the base 116 has a circular shape. The profile function P of the inner surface 115 of the side walls 115 illustrated in FIG. 5B is a non-smooth function formed by multiple straight lines jointed together. The profile function P is constructed according to the above conditions so that the inner surface of the shield reflects out-of-field-of-view radiation impinging thereon onto regions outside the detector's sensitive area. In this example, the shield is radially symmetric about the z axis, and accordingly similar profiles of the cross section of the side walls are obtained with respect to cross section taken with any plane containing the z axis.

Figure 5D:
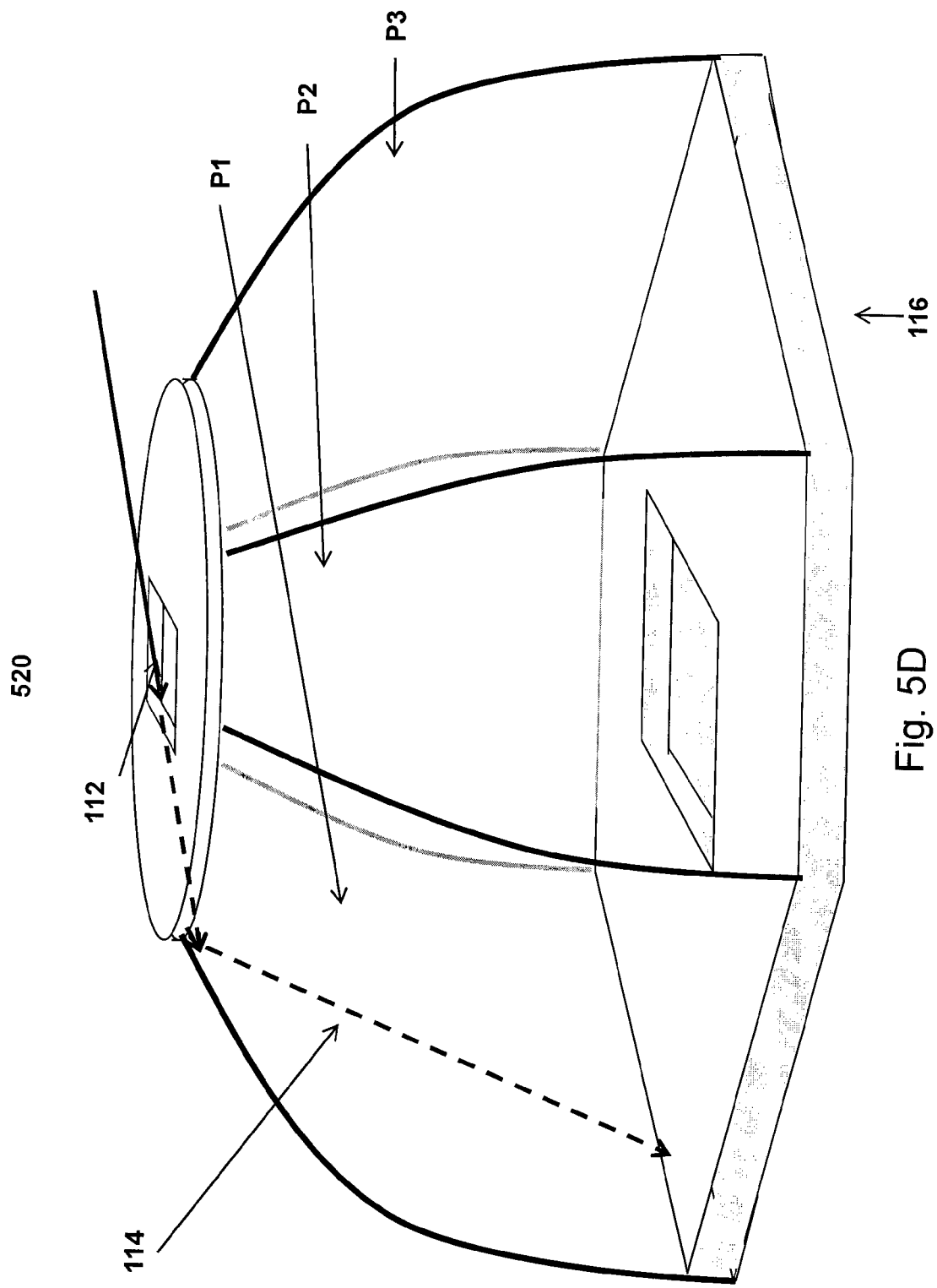

FIGS. 5D, 5E and 5F show another example of a thermal shield 520 of the present invention in which the side walls 114 are formed by multiple panels each extending in between the base and the optical window. In this non limiting example, the shield side walls 114 are constructed of six panels. FIG. 5D illustrates an exploded view of the shield 520. The three frontal (in the figure) panels out of the six panels forming the side walls are designated with reference numbers P1, P2 and P3.

FIG. 5E is a cross sectional view of the shield taken with a secant plane containing both the y axis (marked in FIG. 5F) and the optical axis z of the shield. FIG. 5F is a cross sectional view of the base 116 of the shield 520 in a secant plane perpendicular to the optical axis z. The base 116 has, in this example, a hexagonal shape (having six facets). It should be understood, however, that the invention can be implemented with other shapes of the base including different number of facets. As shown in FIG. 5E, the profile P of the cross section of the inner surface 115 taken with the plane containing the both y and z axes has a smooth elliptical arc shape constructed similarly to the technique described with reference to FIG. 1A and 1B. Since the shield of the present example is not radially symmetric about the z axis (the shape of the base is not circular), the cross-sectional profiles of the shield walls taken with an arbitrary plain containing the z axis might be characterized by profile function P' of a greater or equal value and of a greater or equal slope than the depicted profile P. Accordingly, the inner surface of the shield reflects out-of-field-of-view radiation impinging thereon onto regions outside the detector's sensitive area.

Figure 5G:
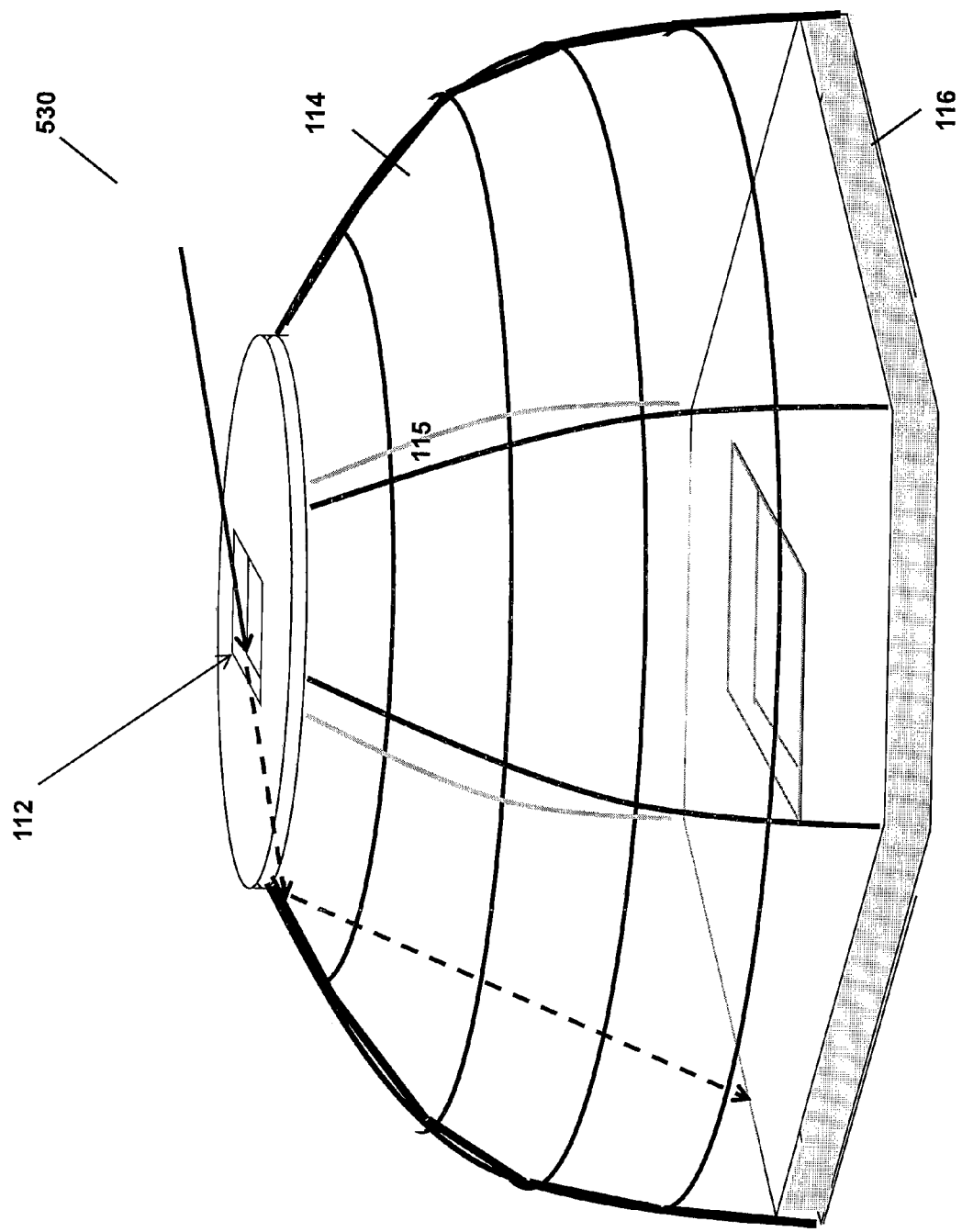

FIG. 5G shows an exploded view of yet another example of a thermal shield 530 according to the present invention in which the side walls 114 of the shield comprise multiple substantially planar facets. In this example, the cross section of the base 116 of the shield 530 taken perpendicularly to the optical axis z has the hexagonal shape shown in FIG. 5F. The cross section profile of the side walls 114 of the shield 530, taken with a plane containing the optical axis z of the shield and the y axis depicted in FIG. 4F, is similar to that shown in FIG. 5B.

Thus, the present invention provides a novel dewar assembly and IR detection system utilizing the same, where a warm shield unit is used being configured as an enclosure for optically enclosing the light collecting region, and having a reflective inner surface of an appropriate geometry such that light portions of the incident light is reflected towards regions outside the light collecting region. Those skilled in the art will readily appreciate various modifications and changes can be applied to the embodiments of the invention as hereinbefore described without departing from its scope defined in and by the appended claims.

The invention claimed is:

1. A dewar assembly for use in an optical IR detection system including an IR detector unit, said dewar assembly comprising:
    a base comprising radiation absorbing regions and arranged for defining a light collecting region of the dewar assembly associated with a designated location for the IR detector; and
    a warm shield unit having an optical window through which incident light enters the dewar assembly and having a reflective inner surface, said warm shield unit forming a thermal shield configured as a sole shield structure configured to optically enclose the base and the light collecting region defined thereby, wherein:
    the reflective inner surface and an outer surface of said warm shield unit have low emissivity not exceeding few percents in wavelengths, to which said IR detector is sensitive, thereby reducing the amount of radiation absorbed by said surfaces and reducing the amount of radiation emitted from said inner surface under given temperature conditions; and
    a shape of the reflective inner surface is configured to reflect light portions propagating through said optical window and impinging thereon towards regions outside said light collecting region.

2. The dewar assembly of claim 1, wherein said reflective inner surface of the warm shield unit is optically exposed to the said light collecting region.

3. The dewar assembly of claim 1, wherein a surface of said radiation absorbing regions, facing said inner surface of said warm shield unit, is highly emissive thereby providing efficient radiation absorbance by said surface of the base.

4. The dewar assembly of claim 3 wherein said surface of said radiation absorbing regions has rough texture minimizing reflection of radiation from the surface.

5. The dewar assembly of claim 1 configured for use in an optical IR detection system including a cryogenic cooling system for cooling at least a light sensitive region of the IR detector unit; said dewar assembly is adapted for thermal coupling between said cryogenic cooling system and said base for cooling the radiation absorbing regions of the base.

6. The dewar assembly of claim 1 configured for use in an optical IR detection system including a temperature stabilization system for stabilizing at least a light sensitive region of the IR detector unit; said dewar assembly is adapted for thermal coupling between said temperature stabilization system and said base for stabilizing the temperature of the radiation absorbing regions of the base.

7. The dewar assembly of claim 1 wherein said warm shield unit comprises a side wall substantially extending from said base towards a surface of said warm shield unit in which said optical window is implemented and defining an optical axis of said dewar assembly designating a general direction of light propagation in between said optical window and said light collecting region.

8. The dewar assembly of claim 7 wherein said inner surface comprises surfaces of said side wall facing towards an interior of said dewar assembly.

9. The dewar assembly of claim 7 wherein said outer surface of said warm shield unit comprises surfaces of said side wall facing towards an exterior of said dewar assembly.

10. The dewar assembly of claim 7 wherein the side wall comprises multiple facets jointed together, said inner surface being formed by jointed surfaces of said facets.

11. The dewar assembly of claim 7, wherein a shape of cross section contour of said inner surface taken within a secant plane containing said optical axis is configured such that the incident light passing through said optical window onto said inner surface is reflected toward at least one radiation absorbing region of said base.

12. The dewar assembly of claim 11, wherein the shape of cross section contour of said inner surface is designed for reducing a surface area of said inner surface thereby enabling to increase a signal to noise ratio of light collection through said light collecting region by reducing amount of thermal radiation emissions from said inner surface.

13. The dewar assembly of claim 12 wherein said shape has concaved curvature.

14. The dewar assembly of claim 11, wherein said shape of the cross section contour is in the form of an elliptical arc.

15. The dewar assembly of claim 11, wherein said shape of the cross section contour is in the form of a hyperbolic arc.

16. An optical IR detection system comprising a dewar assembly according to claim 1, and an IR detector unit arranged at the light collecting region of said dewar assembly.

17. A dewar assembly for use in an optical IR detection system including an IR detector unit, said dewar assembly comprising:
    a base comprising radiation absorbing regions and arranged for defining a light collecting region of the dewar assembly associated with a designated location for the IR detector; and
    a warm shield unit having an optical window through which incident light enters the dewar assembly and having a reflective inner surface, said warm shield unit forming a thermal shield configured to optically enclose the base and the light collecting region defined thereby, wherein:
    the reflective inner surface and an outer surface of said warm shield unit have low emissivity not exceeding few percents in wavelengths, to which said IR detector is sensitive, thereby reducing the amount of radiation absorbed by said surfaces and reducing the amount of radiation emitted from said inner surface under given temperature conditions;
    a shape of the reflective inner surface is configured to reflect light portions propagating through said optical window and impinging thereon towards regions outside said light collecting region; and
    the dewar assembly does not include a cold shield.

18. A dewar assembly for use in an optical IR detection system including an IR detector unit, said dewar assembly comprising:
    a base comprising radiation absorbing regions and arranged for defining a light collecting region of the dewar assembly associated with a designated location for the IR detector; and
    a warm shield unit having an optical window through which incident light enters the dewar assembly and having a reflective inner surface, said warm shield unit forming a thermal shield configured to optically enclose the base and the light collecting region defined thereby, wherein:

the reflective inner surface and an outer surface of said warm shield unit have low emissivity not exceeding few percents in wavelengths, to which said IR detector is sensitive, thereby reducing the amount of radiation absorbed by said surfaces and reducing the amount of radiation emitted from said inner surface under given temperature conditions;

a shape of the reflective inner surface is configured to reflect light portions propagating through said optical window and impinging thereon towards regions outside said light collecting region; and there is no second shield inside the warm shield.

19. The dewar assembly of claim 17, wherein said warm shield unit comprises a side wall substantially extending from said base towards a surface of said warm shield unit, in which said optical window is implemented, and defining an optical axis of said dewar assembly designating a general direction of light propagation in between said optical window and said light collecting region, and wherein said inner surface comprises surfaces of said side wall facing towards an interior of said dewar assembly; said side wall having at least one of the following configurations:

i. the side wall comprises multiple facets jointed together such that said inner surface being formed by jointed surfaces of said facets;

ii. a shape of cross section contour of said inner surface taken within a secant plane containing said optical axis is configured such that the incident light passing through said optical window onto said inner surface is reflected toward at least one radiation absorbing region of said base, and wherein a surface of said radiation absorbing regions, facing said inner surface of said warm shield unit, is highly emissive thereby providing efficient radiation absorbance by said surface of the base;

iii. a shape of cross section contour of said inner surface taken within a secant plane containing said optical axis is designed for reducing a surface area of said inner surface thereby enabling to increase a signal to noise ratio of light collection through said light collecting region by reducing amount of thermal radiation emissions from said inner surface;

iv. a shape of cross section contour of said inner surface taken within a secant plane containing said optical axis has concaved curvature; and v. a shape of cross section contour of said inner surface taken within a secant plane containing said optical axis is in the form of an elliptical arc or an hyperbolic arc.

20. The dewar assembly of claim 18, wherein said warm shield unit comprises a side wall substantially extending from said base towards a surface of said warm shield unit, in which said optical window is implemented, and defining an optical axis of said dewar assembly designating a general direction of light propagation in between said optical window and said light collecting region, and wherein said inner surface comprises surfaces of said side wall facing towards an interior of said dewar assembly; said side wall having at least one of the following configurations:

i. the side wall comprises multiple facets jointed together such that said inner surface being formed by jointed surfaces of said facets;

ii. a shape of cross section contour of said inner surface taken within a secant plane containing said optical axis is configured such that the incident light passing through said optical window onto said inner surface is reflected toward at least one radiation absorbing region of said base, and wherein a surface of said radiation absorbing regions, facing said inner surface of said warm shield unit, is highly emissive thereby providing efficient radiation absorbance by said surface of the base;

iii. a shape of cross section contour of said inner surface taken within a secant plane containing said optical axis is designed for reducing a surface area of said inner surface thereby enabling to increase a signal to noise ratio of light collection through said light collecting region by reducing amount of thermal radiation emissions from said inner surface;

iv. a shape of cross section contour of said inner surface taken within a secant plane containing said optical axis has concaved curvature; and v. a shape of cross section contour of said inner surface taken within a secant plane containing said optical axis is in the form of an elliptical arc or an hyperbolic arc.

\* \* \* \* \*